United States Patent
Sridharan et al.

(10) Patent No.: US 10,275,022 B2
(45) Date of Patent: Apr. 30, 2019

(54) AUDIO-VISUAL INTERACTION WITH USER DEVICES

(71) Applicant: EXCALIBUR IP, LLC, New York, NY (US)

(72) Inventors: Venkatraman Sridharan, Sunnyvale, CA (US); Robert Jacob Kirk, Sunnyvale, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 16/043,914

(22) Filed: Jul. 24, 2018

(65) Prior Publication Data

US 2018/0329488 A1 Nov. 15, 2018

Related U.S. Application Data

(63) Continuation of application No. 14/077,821, filed on Nov. 12, 2013, now Pat. No. 10,048,748.

(51) Int. Cl.
*G06F 3/01* (2006.01)
*G06F 3/16* (2006.01)
*G06F 3/03* (2006.01)
*G10L 15/22* (2006.01)
*G10L 21/10* (2013.01)

(52) U.S. Cl.
CPC .............. *G06F 3/012* (2013.01); *G06F 3/013* (2013.01); *G06F 3/017* (2013.01); *G06F 3/0304* (2013.01); *G06F 3/167* (2013.01); *G10L 15/22* (2013.01); *G06F 2203/0381* (2013.01); *G10L 21/10* (2013.01); *G10L 2015/223* (2013.01)

(58) Field of Classification Search
CPC .......... G06F 3/012; G06F 3/013; G06F 3/017; G06F 3/0304; G06F 3/167; G06F 2203/0381; A61B 3/113; G06K 9/00597; G10L 15/22; G10L 21/10; G10L 2015/223
USPC ........................................................ 345/158
See application file for complete search history.

(56) References Cited

U.S. PATENT DOCUMENTS

| | | | |
|---|---|---|---|
| 6,873,714 B2 | 3/2005 | Witt et al. | |
| 2002/0105482 A1 | 8/2002 | Lemelson et al. | |
| 2002/0110248 A1 | 8/2002 | Kovales et al. | |
| 2006/0071934 A1* | 4/2006 | Sagar | A61B 5/0488 345/473 |
| 2007/0265507 A1 | 11/2007 | de Lemos | |
| 2009/0324024 A1* | 12/2009 | Worthington | A61B 5/103 382/118 |
| 2010/0064259 A1 | 3/2010 | Alexanderovitc et al. | |
| 2011/0001699 A1 | 1/2011 | Jacobsen et al. | |

(Continued)

OTHER PUBLICATIONS

"Augmented reality glasses go handsfree"; PuneMirror.in, 2 pages (2012).

*Primary Examiner* — Stephen G Sherman
(74) *Attorney, Agent, or Firm* — James J. DeCarlo; Greenberg Traurig, LLP

(57) ABSTRACT

A user device is enabled by an audio-visual assistant for audio-visual interaction with a user. The audio-visual assistant enables the user device to track the user's eyes and face to determine objects on the screen that the user is currently observing. Various tasks can be executed on the objects based on further input provided by the user. The user can provide further inputs via facial gestures, voice or combinations thereof for executing the various tasks.

20 Claims, 11 Drawing Sheets

(56) References Cited

U.S. PATENT DOCUMENTS

| | | | |
|---|---|---|---|
| 2012/0039507 A1* | 2/2012 | Ikenoue | G06F 3/012 382/103 |
| 2012/0288139 A1* | 11/2012 | Singhar | G06F 1/3265 382/103 |
| 2012/0293406 A1 | 11/2012 | Park et al. | |
| 2013/0169532 A1 | 7/2013 | Jahnke | |
| 2014/0015778 A1 | 1/2014 | Taguchi et al. | |
| 2015/0199082 A1 | 7/2015 | Scholler et al. | |

* cited by examiner

AUDIO-VISUAL INTERACTION WITH USER DEVICES

CROSS REFERENCES TO RELATED APPLICATIONS

This application is a continuation of and claims priority from co-pending U.S. patent application Ser. No. 14/077,821, filed on Nov. 12, 2013, entitled "AUDIO-VISUAL INTERACTION WITH USER DEVICES," the entirety of which is incorporated herein by reference.

BACKGROUND

Mobile devices like smartphones and tablet computers have gained universal popularity because of their portable sizes and ease of interaction. Traditional input interfaces such as keyboards, mouse, joysticks or other hardware based input are replaced in the current generation of mobile devices with touch and voice interfaces. While keyboards are still employed in the mobile devices their use has been replaced in some applications with voice interfaces. The voice interfaces that are currently used in the mobile applications help with inputting a search query for obtaining information from the Internet or retrieving information such as driving directions to particular destinations. Other applications are available which convert user voice input into text output on a screen.

SUMMARY

This disclosure relates to systems and methods for enabling user devices for audio-visual interactions with the users. A processor-executable method of enabling a user device for audio-visual interaction with a user is disclosed in one embodiment. The method comprises, accessing, by a processor, an audio-visual assistant that is executed on a user device, the audio-visual assistant comprising an optical detection function for detecting eye movements of a user of the device and an audio detection function that enables audio interaction by the user with the device. A portion of a display screen currently being observed by the user is determined and a user interface element displayed within the portion of the display screen is identified by the processor. A command from the user to control the identified user interface element is received by the processor and a task to be associated with the user interface element is selected from a plurality of tasks corresponding to respective plurality of commands associated with the audio visual assistant. The selected task associated with the user interface element is executed by the processor based at least on the received command from the user.

In an embodiment, the audio-visual assistant is configured to receive a subset of the plurality of commands as input via the optical detection function. In an embodiment, the audio-visual assistant is configured to receive a second subset of the plurality of commands as input via the audio detection function. In an embodiment, the audio-visual assistant is configured to receive a third subset of the plurality of commands as a combination of inputs via the optical detection function and via the audio detection function. In an embodiment, the command is received as the combination such that the identified user interface element is selected in response to the input received via the optical detection function and the task is selected in response to the input received via the audio detection function. In an embodiment, the first, second and third subsets are distinct subsets with no overlaps. In an embodiment the input to the audio detection function is converted to text. A command in program code that maps to the text is identified and a code block associated with the command is executed.

In an embodiment, determining the portion of the display screen further comprises calibrating the user's face such that positions of features on the user's face relative to the display screen are mapped and storing information regarding the positions in a data storage of the user device. A cursor is displayed by the processor upon conclusion of the calibration on the portion of the display screen currently being observed by the user. The user interface element displayed below the cursor on the portion of the display screen is identified by the processor for control by the command. In an embodiment, the user interface element is associated with a software application being executed on the user device.

A computing device comprising a processor and a storage medium for tangibly storing thereon program logic for execution by the processor is disclosed in an embodiment. The program logic comprises accessing logic, executed by the processor, for accessing an audio-visual assistant on a user device, the audio-visual assistant comprising an optical detection function for detecting eye movements of a user of the device and an audio detection function that enables audio interaction by the user with the device. Determining logic, is executed by the processor for determining via the audio-visual assistant, a portion of a display screen currently being observed by the user. The processor executes identifying logic, for identifying a user interface element displayed within the portion of the display screen. Receiving logic is executed by the processor, for receiving a command from the user to control the identified user interface element. A task to be associated with the user interface element from a plurality of tasks is selected by the selecting logic executed by the processor so that the selected task associated with the user interface element is executed by the processor based at least on the received command from the user. In an embodiment, the plurality of tasks correspond to respective plurality of commands associated with the audio-visual assistant.

In an embodiment, the receiving logic comprises visual input receiving logic is executed by the processor for receiving a first subset of the plurality of commands as input via the optical detection function. In an embodiment, the receiving logic comprises audio input receiving logic, executed by the processor for receiving a subset of the plurality of commands as input via the audio detection function. In an embodiment, the receiving logic comprises combination input receiving logic is executed by the processor, for receiving a subset of the plurality of commands as a combination of inputs via the optical detection function and the audio detection function. The input received by the audio detection function to is converted to text by the voice converting logic, executed by the processer. Command identifying logic is executed by the processor, for identifying a command in program code that maps to the text.

In an embodiment, the determining logic further comprises calibrating logic, executed by the processor, for calibrating the user's face such that positions of features on the user's face relative to the display screen are mapped The calibrating logic further comprises storing logic, executed by the processor, for storing information regarding the positions in a data storage of the user device and cursor displaying logic for displaying a cursor upon conclusion of the calibration on the portion of the display screen currently being observed by the user.

A computer readable storage medium comprising processor-executable instructions is disclosed in an embodiment.

The instructions when executed by the processor cause the processor to access an audio-visual assistant that is executed on a user device, the audio-visual assistant comprises an optical detection function for detecting eye movements of a user of the device and an audio detection function that enables audio interaction by the user with the device. The instructions further cause the processor to determine a portion of a display screen currently being observed by the user via the audio-visual assistant, identify a user interface element displayed within the portion of the display screen and receive a command from the user to control the identified user interface element. A task is selected for association with the user interface element from a plurality of tasks, the plurality of tasks corresponding to respective plurality of commands associated with the audio visual assistant. The selected task associated with the user interface element is executed based at least on the received command from the user.

In an embodiment the audio-visual assistant is configured to receive a subset of the plurality of commands as a combination of input via the optical detection function and input via the audio detection function. The computer readable medium further comprises instructions that cause the processor to convert input received by the audio detection function to text and execute a code block associated with the textual command.

In an embodiment, the computer readable medium of claim further comprises instructions that cause the processor to calibrate the user's face such that positions of features on the user's face relative to the display screen are mapped and store information regarding the positions in a data storage of the user device.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
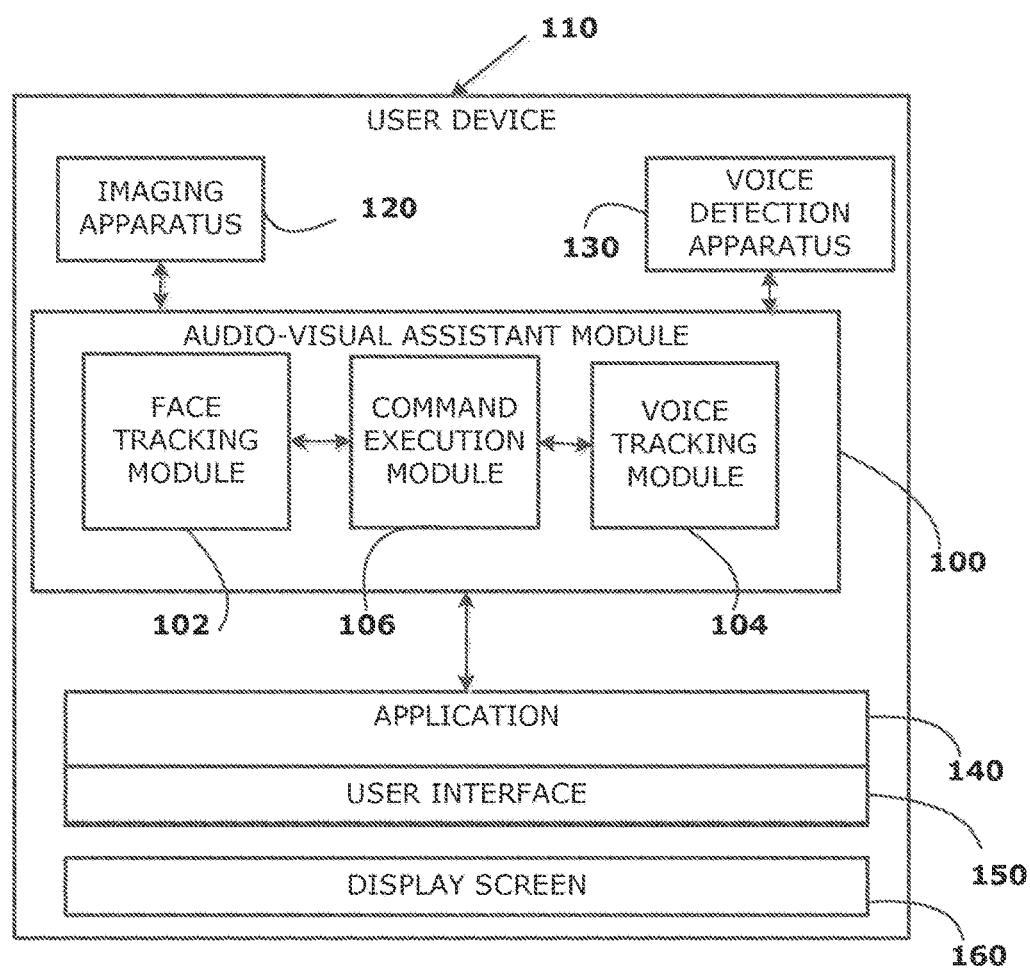
FIG. 1 the audio-visual assistant module is illustrated as being external to the application in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Portable communication devices that are now available provide multiple ways for users to interact with them. While legacy communication and computing devices used electromechanical devices such as key boards or mice to receive user input for executing tasks, the mobile computing and communication devices that are now available such as laptop computers, smartphone or tablet devices include touch and voice interfaces that execute tasks based on a user's voice input or physical interaction with a touchscreen. In fact, nearly all the applications that are now developed for smartphones or tablets are controlled by the touch or voice assistants that help with inputting a search query (for example, Google Search), or performing an action on the screen. However, the touch/voice interfaces that are currently available only work at an application level so that they are tightly integrated with the respective applications into which their features are bundled. Consequently they only enable the applications into which they may be integrated. Moreover, many interfaces also require a user's touch and hence do not completely operate in a hands-free mode.

Embodiments described herein provide for an audio-visual framework that enables controlling software applications on mobile computing devices via one or more of a user's eyes, face and voice. Using an imaging device, for example, a front facing camera on a smartphone, the user's face and its features are tracked to identify the object the user's wishes to interact with and tasks or actions can be executed by the software for that object selected by the user for interaction. The tasks can be executed via one or more of facial gestures or movements, voice commands and combinations thereof. The audio-visual framework as described herein can be provided not only at the application level but may also be integrated into a computing/communication device so that any software application that is configured for the device can be enabled for audio-visual control by the user in accordance with embodiments described herein.

Turning now to the figures, FIG. 1 illustrates an audio-visual framework implemented in accordance with one embodiment. A user computing/communication device 110 can include devices such as but not limited to, a desktop computer, laptop computer, a smartphone, a tablet device or a wearable computing/communication device that comprises an imaging apparatus such as a front facing camera 120 and a sound detection apparatus such as a microphone 130. An audio-visual assistant module 100 comprised within the user device 110 interacts with the imaging apparatus 120 and the voice detection apparatus 130 to enable the application 140 for audio-visual interaction with a user. In an embodiment, the audio-visual assistant module 100 comprises a face tracking module 102, a voice tracking module 104 and a command execution module 106. The audio-visual assistant module 100 thus enables the application 140 with an optical detection function via provision of the face tracking module 102 to receive visual data associated with the user such as a user's face or its features such as the eyes. The audio-visual assistant module 100 also enables the application 140 with an audio detection function via the provision of the voice tracking module 104 to detect a user's voice. The received visual and audio data or combinations thereof are employed by the command execution module 106 for manipulating objects or elements of a user interface 150 of the application 140 that appear on a display screen 160 of the user device 110.

In FIG. 1 the audio-visual assistant module 100 is illustrated as being external to the application 140 in accordance with one embodiment. For example, the audio-visual assistant module 100 can be associated with the operating system of the user device 110. This facilitates providing access to the audio-visual assistant module 100 to other applications of the user device 110. Hence, a plurality of applications of the user device 110 can be configured for audio visual user interaction in accordance with embodiments described herein. In an embodiment, wherein the audio-visual assistant module 100 is comprised in the user device 110, the audio-visual assistant module 100 can continue to run in the background even if the user is away or not currently interacting with the user device 110. This facilitates the audio-visual assistant module 100 to begin audio-visual interaction even as the user starts interacting again with the user device 110.

In an embodiment, the audio-visual assistant module 100 can be integrated with the application 140. Hence, even if the operating system of the user device 100 does not provide access to the audio-visual assistant module 100, applications executed on the user device 100 can still be configured for audio visual interactions in accordance with embodiments described herein. In an embodiment wherein the audio-visual assistant module 100 is associated with the application 140 only and not with the user device 110, minimizing or exiting the application 140 can also result in de-activating the audio-visual assistant module 100 thereby optimizing power usage of the user device 110.

In an embodiment, the face tracking module 102 and the voice tracking module 104 comprised within the audio-visual assistant module 100 can be configured for separate interaction with the command execution module 106. The application 140 can be coded to execute commands based on serial or parallel application of data from the face tracking module 102 and the voice tracking module 104. Thus, the command execution module 106 is configured to execute different types of commands based on the modality through which they are received by the user device 110. In an embodiment, a first set of commands comprise only visual commands received by the user device 110 via the optical detection function as implemented by the face tracking module 102. In an embodiment, a second set of commands comprise voice-only commands received by the user device 110 via the voice detection function as implemented by the voice tracking module 104. In an embodiment, a third set of commands can comprise commands that include input from the optical detection function and the input from the voice detection function. Thus the face tracking module 102 and the voice tracking module 104 can be configured for synchronous interaction with the command execution module 106 so that certain tasks can be executed via an audio-visual command which is deciphered by the audio-visual assistant module 100 based on a combination of gaze tracking and voice commands. For example, an element or object or a class instance on the graphical user interface 150 can be related to the application 140 and shown on the display screen 160. The objects the user interacts with can depend on the application. In an embodiment, an element of the user interface 150 is the object itself. In an embodiment, an element of the user interface can be a tool for interacting with an object of the application 140. For example, if the application 140 is a webpage associated with a website the object can be an image, a link to another webpage or website, an advertisement or another GUI (Graphical User Interface) element enabled for user interaction. In another instance, if the application 140 is a video game for playing basketball, the object(s) for audio-visual interaction in accordance with embodiments described herein would include the ball, the basket, other players or any other element of the virtual game the user interacts with.

For any given software application 140 the object or element of the user interface may be identified for manipulation based on the gaze tracking data obtained from the face tracking module 102. In particular, the user interface element is identified on the basis that it is being observed by the user. In an embodiment, the user interface element can be further manipulated by the command execution module 106 via a command received in accordance with the different modalities as described supra.

In one embodiment, the face tracking module 102 is configured to receive data associated with the user's face from the imaging apparatus 120, analyze the imaging data to identify the approximate location of the user's facial features with respect to the display screen 160. Based on the analysis, the user's facial features are tracked in order to enable visual control of the objects of the application 140 by the user. The imaging data that is initially obtained via execution of a calibration procedure aids in mapping the relative positions of the user's facial features with respect to the display screen 160. Subsequent tracking of the user's facial features, for example, the user's gaze is employed for execution of tasks such as but not limited to tap, swipe or spin by the command execution module 106.

The voice tracking module 104 is similarly configured to obtain the user's voice data via the microphone 130. Various technologies that are currently known can be implemented for analyzing the voice data in order to recognize the commands delivered by the user. In an embodiment, the commands can be specific to the application 140. The application 140 is hard coded with certain commands/keywords which when delivered by the user vocally, cause the application 140 to execute specific blocks of code associated with the commands. Thus, a processor associated with the user device 110 is configured via the command execution module 106 to carry out specific tasks related to the application 140 based on voice commands.

Although the command execution module 106 is shown to be part of the audio-visual assistant module 100, it may be appreciated that this is not necessary. In an embodiment, the command execution module 106 can be comprised in the application 140. The application 140 can comprise code blocks associated with the various types of input provided by the user. Accordingly, the application is configured to execute respective code blocks upon being provided with the appropriate input. For example, the application 140 can be configured to select a particular element when the user observes it for a predetermine time period, such as, 5 seconds. Subsequently, the application 140 can execute tasks on the selected element based on the input received in accordance with embodiments described herein.

Figure 2:
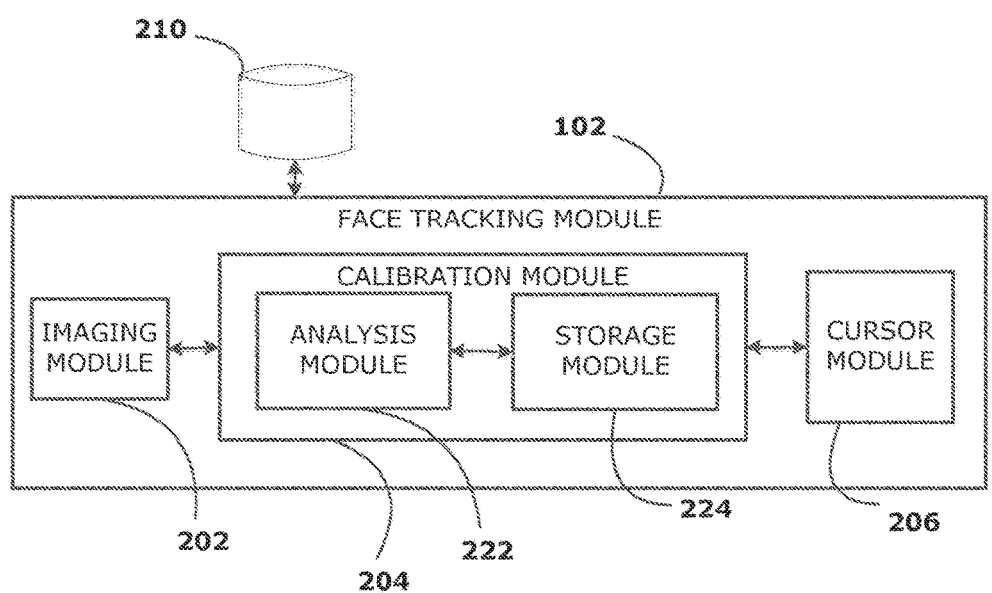
FIG. 2 is a block diagram that shows the details of the face tracking module in accordance with one embodiment.

FIG. 2 is a block diagram that shows the details of the face tracking module 102 in accordance with one embodiment.

The face tracking module 102 is configured to obtain data regarding a user's facial features, identify their positions with respect to the display screen 160 and continue to track the facial features so that the application 140 (or other applications on the user device 110) are enabled for visual control. In an embodiment, visual control is not only exercised via the user's eyes but can include the entire face. In an embodiment, visual control or visual interaction of the user with the application 140 can comprise interacting with the application via tilting his/her head, nodding or facial gestures such as winking or grimacing.

An imaging module 202 comprised within the face tracking module 102 is configured to obtain data associated with a user's face. In an embodiment, the imaging module 202 can be activated when the user device 110 is initially activated by a user. In an embodiment, the imaging module 202 can be activated when the user initially opens the application 140 for execution on the user device 110. Upon activation, the imaging module 202 is configured to switch on the imaging apparatus or a camera 120 of the user device 110. When the camera 120 is switched on, it begins to transmit data in its field of view to the calibration module 204 for beginning the calibration procedure. In an embodiment, the imaging module 202 can be configured to indicate, for example, via displaying a geometric shape, the area on the display screen 160 within which the user is to place his face so that it can be calibrated. The imaging module 202 may thus be configured to identify if the user's face is within the field of view of the camera 120 based for example, on known automatic detection procedures that determine variations in colors, contours and textures within the camera's 120 field of view.

The data regarding the user's face as captured by the imaging module 202 is transmitted to the calibration module 204 for analysis and storage. In an embodiment, an analysis module 222 comprised within the calibration module 204 is configured to analyze and determine relative positions, including angles and distances of the user's facial features with respect to the display screen 160. This enables the audio-visual assistant module 100 to identify elements of user interface 150 shown on the display screen 160 that the user is looking at so that appropriate commands can be executed. In an embodiment, attributes of the display screen 160, such as its area, shape and magnitude of each side is also transmitted to the analysis module 222 in order to determine the relative positions of the user's features. Various mathematical procedures currently known or to be invented can be employed for determining the positions of the user's facial features with respect to the display screen 160.

The information derived by the analysis module 222 is transmitted to the storage module 224 for saving to the storage device 210. In an embodiment, the storage device 210 can be a processor-readable, non-transitory storage medium comprised within the user device 110. Thus, when a user frequently employs the user device 110, then the user's face may not be calibrated each time. Rather, data associated with the user's face that was gathered and stored from prior calibration efforts is retrieved from the storage device 210 and used for enabling the audio-visual interaction. In an embodiment, the audio-visual assistant module 100 can execute the calibration procedure when there are frequent errors in reading the user's audio-visual input and/or executing the corresponding commands. In an embodiment, the display screen 160 can display a user interface element that can be activated by the user for executing a calibration procedure.

When the calibration procedure is completed, the information regarding the relative positions of the user features with respect to the display screen 160 is transmitted to the cursor module 206. In addition, data regarding the current field of view as gathered by the imaging module 202 is also transmitted to the cursor module 206. The cursor module 206 is configured to map relative positions of the user's facial features from the current field of view and the display screen 160 so that the cursor module 206 can determine the part of the display screen 160 the user is currently observing. A cursor is generated and displayed by the cursor module 206 at the portion of the display screen 160 currently being observed by the user thereby indicating to the user that the application 140/user device 110 is ready for audio-visual interaction with the user. In an embodiment, the cursor module 206 can be further configured to transmit information regarding one or more of the location of the cursor, the portion of the display screen 160 and/or the graphical user interface element currently being observed by the user to the command execution module 106.

In an embodiment, commands delivered only via facial gestures of the users can be transmitted by the facial tracking module 102 to the command execution module 106 for execution. By the way of illustration, upon completing the calibration procedure and obtaining the current field of view of the camera 120, the audio-visual assistant module 100 waits to receive further input from the user for a predetermined time period. During this time period, the face tracking module 102 continues to track the user's face in order to detect any further input by the user. In an embodiment, the further user input can comprise a gesture such as but not limited to, a nod or tilt of the head, facial gestures such as but not limited to winking or grimacing or the user simply observing one particular element of the user interface 150 displayed on a portion of the display screen 160. In an embodiment, the application 140 can be configured to execute particular code portions for one or more of the gestures. In an embodiment, the code execution module 106 can be configured to execute certain common default actions such as but not limited to tap, spin or swipe across the plurality of applications executed by the user device 110 provided the plurality of applications have access to the audio-visual assistant module 100.

Figure 3:
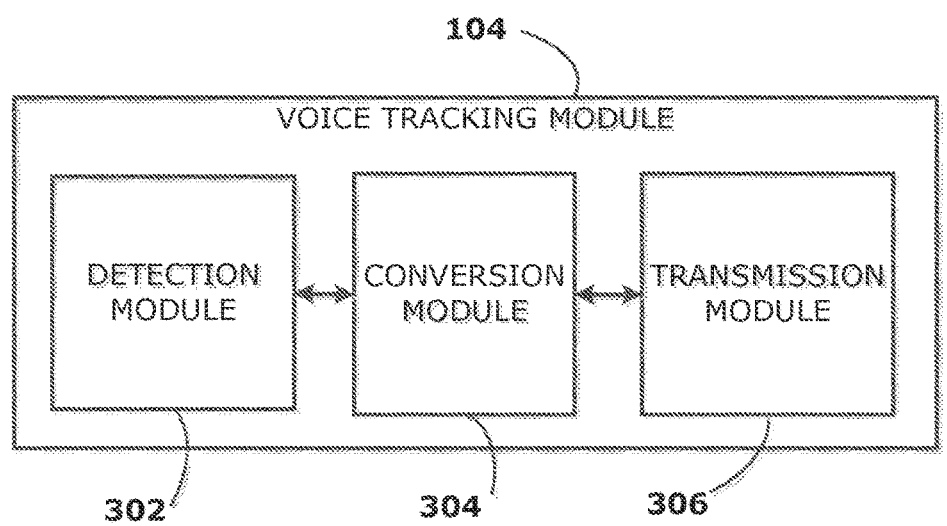
FIG. 3 is a schematic diagram illustrating the details of the voice tracking module in accordance with one embodiment.

FIG. 3 is a schematic diagram illustrating the details of the voice tracking module 204 in accordance with one embodiment. The voice tracking module 104 comprises a detection module 302, conversion module 304 and a transmission module 306. The voice tracking module 104 is configured to receive the user's voice input and facilitate execution of the corresponding actions/tasks. The detection module 302, in one embodiment, receives the sound input detected by the microphone 120 and transmits it to the conversion module 304 for converting the received sound input to text. It may be appreciated that the application 140 can be coded with commands in any one of the plurality of world languages and accordingly, the auditory command that is received may be in any one of the plurality of languages that the application 140 is configured to receive. In an embodiment, the application 140 can also be coded with commands from more than one language and if the text output by the conversion module 304 matches any one of the commands coded into the application 140, the corresponding code blocks can be executed.

In an embodiment, if the detected sound input cannot be converted, the user may be alerted to speak the command again. After a predetermined number of failed attempts to obtain the user's voice command, the audio-visual assistant module 100 can be configured to execute any action associated only with data from other modules, such as, the face tracking module 102. It may be appreciated that unless specifically coded in the application 140 or in other modules of the audio-visual assistant module 100, the output of the conversion module 304 need not be displayed to the user. In an embodiment, the transmission module 306, obtains the output of the conversion module 304 and communicates it to the command execution module 106 to facilitate execution of the appropriate code within the application 140.

Figure 4:
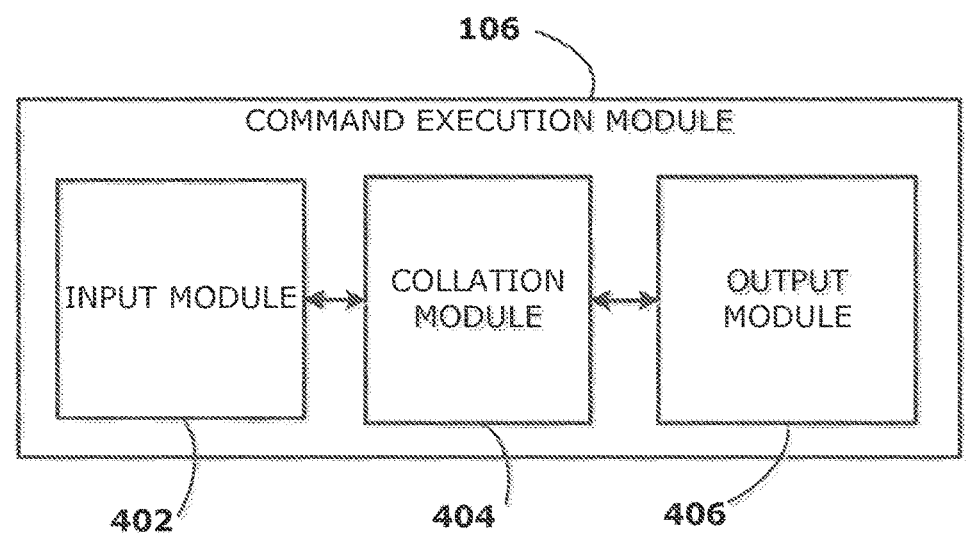
FIG. 4 illustrates a schematic diagram showing the details of the command execution module in accordance with an embodiment.

FIG. 4 illustrates a schematic diagram showing the details of the command execution module 106 in accordance with one embodiment. As described herein, the application 140 can be hard coded wherein certain code blocks are associated with the commands/keywords so that when the user utters those keywords/commands, alone or in combination with other input, the corresponding actions are executed by the command execution module 106. In an embodiment, the executed tasks can be associated with gaze-only or voice-only commands in one embodiment wherein either the face tracking module 102 or the voice tracking module 104 would interact with the command execution module 106. The executed tasks, in one embodiment, can be audio-visual commands wherein the input from the face tracking module 102 is combined with the voice input received by the voice tracking module 106 in order to cause the user device 110 to execute certain tasks. The executed tasks can be related to the application 140 in an embodiment. The executed actions can comprise default actions that are applied across applications on the user device 110 in accordance with one embodiment.

An input module 402 is configured to receive a plurality of inputs associated with the user currently interacting with the user device 110 via one or more of the face tracking module 102 and the voice tracking module 104. At the commencement of the interaction, the command execution module 106 can receive location of the cursor and optionally a graphical user interface element that may be positioned below the cursor. The input module 402 is also configured to receive additional text input from the voice tracking module 104 providing any voice command from the user.

The input received from the plurality of input sources is gathered by the collation module 404 which collates the inputs and determines an execution order for the inputs so that an task desired by the user is accurately determined. In an embodiment, the received inputs are serially applied to a particular user interface element. For example, input from the face tracking module 102 is used to execute an initial task such as, selecting an object, and subsequent voice input provides a command that is associated with code that acts on the object. In an embodiment, the command execution module 106 can be configured to wait for a short time period after receiving input from the face tracking module 102 to receive any further input from the voice tracking module 104. If no further input is received at the end of the wait period, a command associated with only visual input is identified for execution. Similarly, input from the voice tracking module 104 can also be received without being preceded by any input from the face tracking module 102. In this case, a task or code block associated with the voice command is identified and executed. In an embodiment, the output module 406 is configured to provide output directly to the display screen 106. In an embodiment wherein the command execution module 106 is associated with the application 140, the output module 406 can be configured to provide output of the executed tasks to the application 140 which may or may not further process the output prior to presenting it on the display screen 106.

Figure 5:
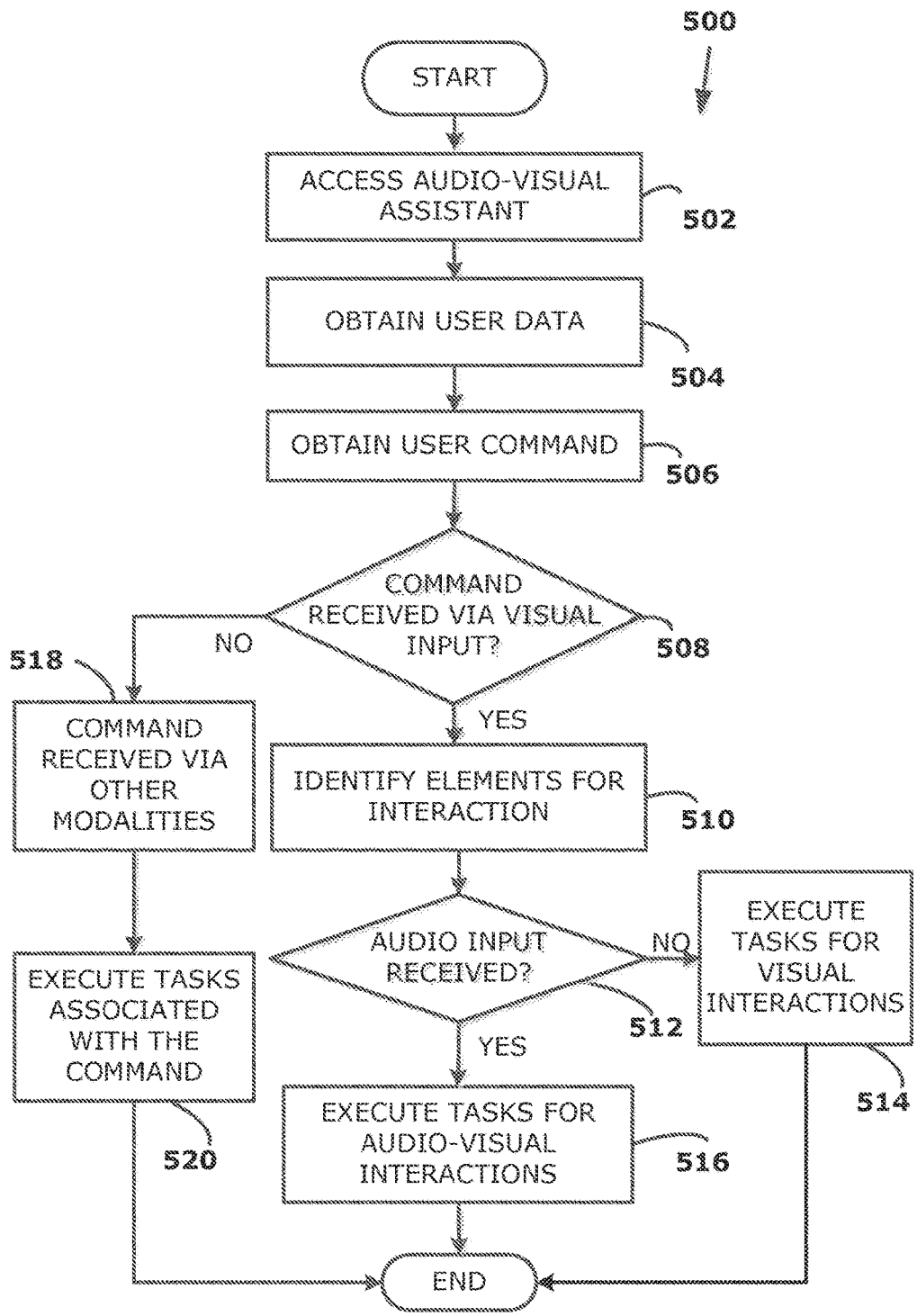
FIG. 5 is a flowchart that shows the details of a method of enabling audio-visual interaction of a user with a user device in accordance with embodiments described herein.

FIG. 5 is a flowchart 500 that shows the details of a method of enabling audio-visual interaction of a user with a user device 110 in accordance with one embodiment. The method begins at 502 with the user device 110 accessing the audio-visual assistant module 100 that enables the user device 110 to receive visual and auditory input from the user and interact accordingly. In an embodiment, the audio-visual assistant module 100 can be accessed when the application 140 which is coded for audio visual interaction is initially opened. In an embodiment, the audio-visual assistant module 100 is accessed when the user device 110 is initially powered on or otherwise activated by the user. At 504, user data is obtained in order to begin audio-visual interaction with the user. In an embodiment, stored user data such as the dimensions of the user's face and information regarding the user's facial features is retrieved from local data storage 210 in order to being audio-visual interaction in accordance with embodiments described herein. In an embodiment, the user data can be obtained at 504 via executing a calibration procedure as described herein. At 506, a user command is received. The user can deliver the command via various inputs such as, by providing visual input to the imaging apparatus 120, by providing audio input to the microphone 130, touch input to the display screen 160 or combinations thereof. At 508 it is determined if the received command is delivered by the user via providing visual input to the imaging apparatus 120.

If yes, based at least on the received visual input, a portion of the display screen 160 receiving the user's gaze is determined and one or more user interface elements displayed thereon can be identified for interaction as shown at 510. In an embodiment, the identified user interface elements can be coded to interact solely via the visual input. Thus, the received visual input can cause one or more tasks to be executed on the objects based on the code associated therewith in the application 140. In an embodiment, the identified user interface elements coded not only for visual commands but can also be further coded for audio-visual interaction. For example, the visual input received at 508 can cause the user interface elements to be selected for further interaction via other modalities such as via audible commands or event touch interaction. In an embodiment, the number of elements identified at 510 can depend on the area of the display screen 160 identified as receiving the user's gaze and the code associated with the user interface elements which may permit only one element or multiple elements to be selected for interaction. At 512 it is determined if further audio input is received via the audible command uttered by the user through the microphone 130. If yes, at 516, one or more code blocks associated with the audible command are executed in association with the user interface elements selected for the audio-visual interaction at 510. If no audible commands are received, then it is determined that the user intended to interact via visual input only and accordingly code blocks associated with the visual input are executed at 514. For example, if the application 140 is a game, the user observing some elements of the game for a predetermined time period may cause some transformation and accordingly such task is executed at 514.

If at 508, it is determined that no visual input has been provided by the user to the imaging apparatus 120, it is determined at 518 that the command received at 506 has been delivered via a modality other than the imaging apparatus 120. For example, the user may have provided an audible command to the microphone 140 or provided touch input to the display screen 160. Based on the modality employed by the user to provide the command at 506 and based on the code blocks comprised in the application 140 for such commands, appropriate tasks are executed at 520. Thus, in accordance with embodiments described herein an object or an element of the application 140 or the user device 110 can be coded for different tasks based on how the input is received.

Figure 6:
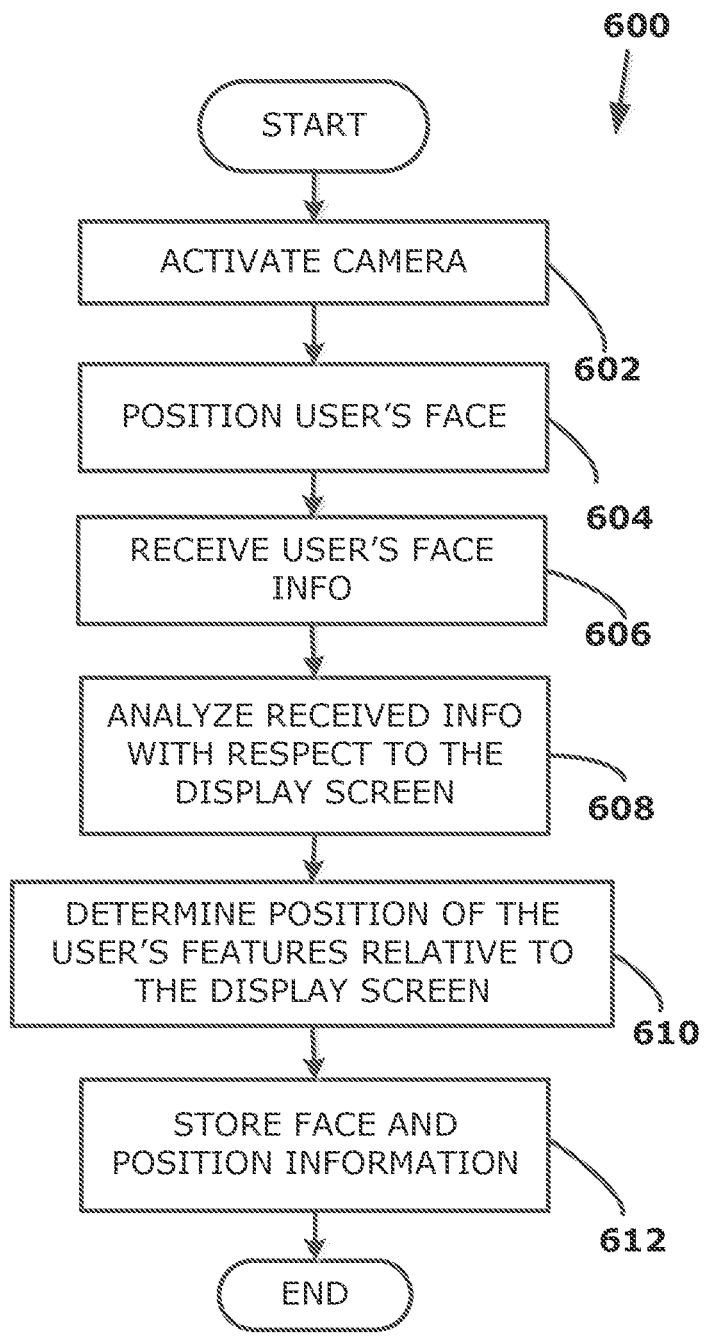
FIG. 6 is a flow chart that details a method of collecting data associated a user's face in accordance with one embodiment.

FIG. 6 is a flow chart 600 that details a method of collecting data associated a user's face in accordance with one embodiment. The method begins at 602 with the activation of the camera 120. The user is instructed at 604 to position his/her face properly, for example, within an optimized imaging area of the camera 120 so that it may be calibrated accurately. At 606 the information regarding the user's face is received. The user's face information is analyzed with respect to the size and relative position of the display screen 160 as shown at 608. This facilitates determining accurately at 608, the relative position of the user's facial features with respect to the display screen 160 of the user device 110 so that the area of the display screen 160 that is being observed by the user. The information gathered during the calibration procedure, such as but not limited to, information regarding the user's facial features as received at 606 and the relative positions of the facial features with respect to the display screen are saved to the storage device 210 at 612. This facilitates retrieving the required information when the user temporarily suspends usage of the user device 110 without having to re-execute the calibration procedure.

Figure 7:
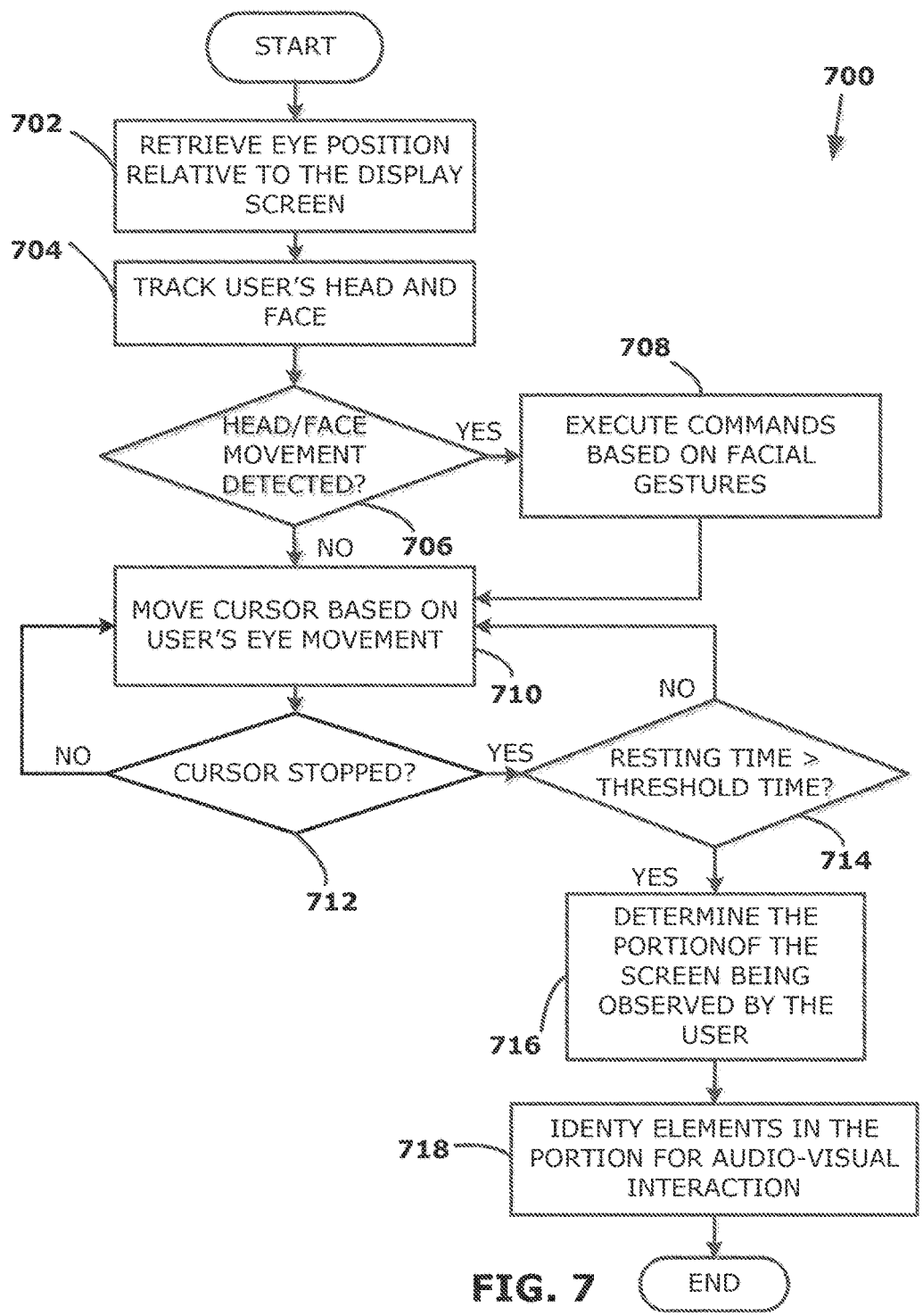
FIG. 7 illustrates a method of facilitating visual interaction between a user and a user device in accordance with one embodiment.

FIG. 7 illustrates a method 700 of facilitating visual interaction between a user and a user device 110 in accordance with one embodiment. The method begins at 702 with the user device retrieving the positions of the users eyes relative to the display screen 160 in accordance with embodiment described herein. At 704, the face tracking module 102 begins tracking the user's face in order to obtain visual input such as but not limited to, movement of the user's head, facial gestures and portion of the display screen 160 that is currently being viewed by the user. As described supra, at the end of the calibration procedure or upon retrieval of the user data, a cursor or icon appears on the display screen 160 indicating that the user device 110 is ready to receive audio-visual input from the user. Accordingly, at 706 it is determined if any head/facial movement is detected. The head movement can comprise gestures such as but not limited to tilting of the head, moving the head left or right, nodding and facial movements can comprise gestures such as but not limited to winking, grimacing or moving eyebrows. If any gestures associated with the head/facial movements are detected, then commands associated with such movements are executed at 708. Subsequently, at 710 the face tracking module 102 continues to track the user's gaze at 710 and move the cursor to portions of the display screen 160 being observed by the user. Thus, the cursor/icon that appears on the display screen 160 moves in a manner that tracks the movement of the user's gaze across the display screen 160. The step of moving the cursor to track the user's gaze can also occur if no commands are associated with such movements or if no head/facial movements are detected. At 712, it is determined if the cursor has stopped. If the cursor continues to move, the face tracking module 102 continues to track the user's gaze as shown at 710. If it is determined that the user's gaze has stopped moving, the resting period of the user's gaze is polled and compared with a predetermined time period, for example, 5 seconds. The user's gaze is continued to track during the time period to determine further movement. If the user's gaze remains steadily on a particular portion of the display screen 160 until the predetermined time period is exceeded as shown at 714, the portion of the display screen 160 that is being observed by the user or being focused on by the user is determined at 716. At 718, elements displayed on the portion of the display screen 160 are identified for further user interaction.

Figure 8:
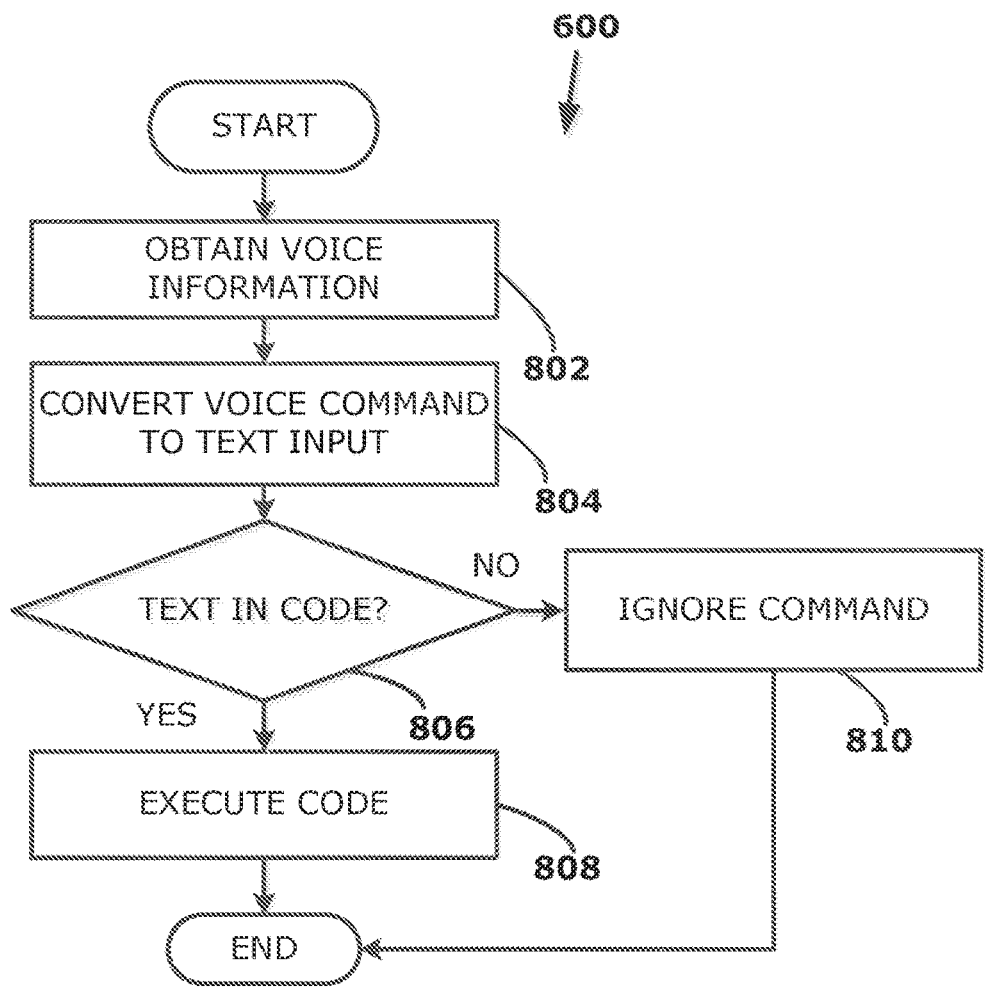
FIG. 8 shows a method of obtaining voice input from a user and executing tasks based on the voice input in accordance with one embodiment.

FIG. 8 shows a method 800 of obtaining voice input from a user and executing tasks based on the voice input in accordance with one embodiment. The method begins at 802 with the microphone 130 obtaining voice input from the user. At 804, the user's voice input is converted to text input and at 806 it is determined if the command received via the text input has one or more code blocks associated therewith. If yes, the code blocks associated with the command are executed at 808. If it is determined at 806 that no code blocks are associated with the command, the command is ignored as shown at 810.

Figure 9:
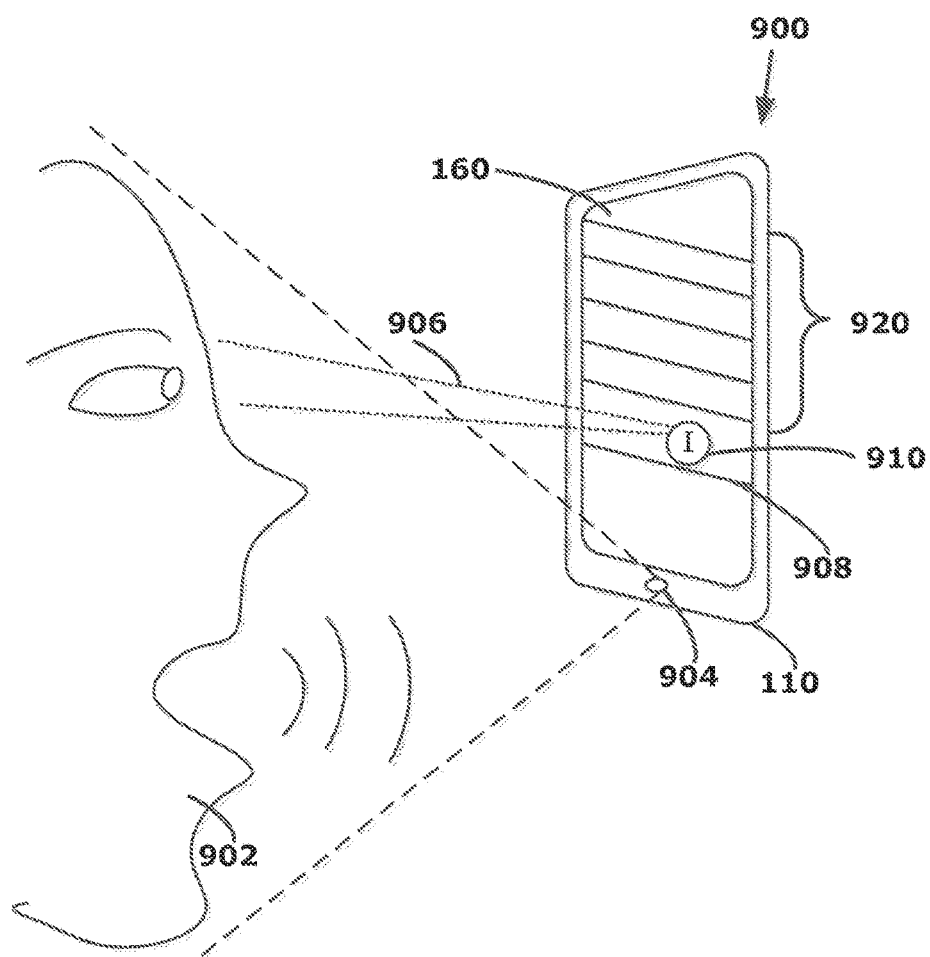
FIG. 9 is an illustration that shows a user interaction with the user device in accordance with one embodiment.

FIG. 9 is an illustration 900 that shows a user interaction with the user device 110 in accordance with one embodiment. A user employs the user device 110 comprising the audio-visual assistant module 100 in accordance with embodiments described herein. The audio-visual assistant module 100 is configured to calibrate the user's face 902 and subsequently enable audio-visual interaction of the user with the user device 110. Based on the visual input received by the front facing camera 904 of the user device 110, the audio-visual assistant module 100 determines that the user's gaze 906 is currently observing the user element 908. Accordingly, a cursor 910 appears at the point of the display screen 160 currently being observed by the user. Based on further visual or audio input or combinations thereof audio-visual interaction of the user with the user element 908 is enabled.

By the way of illustration and not limitation, a use-case scenario will be described below. For example, if the application 140, is an email program, based on the visual input from the camera 904, it can be determined that the user is viewing the email 908 in a listing of emails 920. If the user's gaze continues to rest on the email 908, based on the positioning of the cursor 910, the email 908 can be selected for further interaction. An audio command uttered by the user can execute the corresponding task on the selected email 908. For example, the user may utter any of the commands such as but not limited to, "Delete", "Spam message", "Next message", "Mark message unread", "Mark message read" or "Back". In an embodiment, the user can also utter an audio command that is unrelated to the selected email 908. For example, the user may utter a command such as but not limited to, "Sidebar", or "Exit" to cause the sidebar of the email application 140 to appear or to exit the email application 140. Although these commands are not particularly related to the selected email message 908, they can still be executed based at least on how the email application 140 is programmed. Thus, based on a modality of the input a single object can be configured to execute different tasks by the audio-visual assistant module 100.

Figure 10:
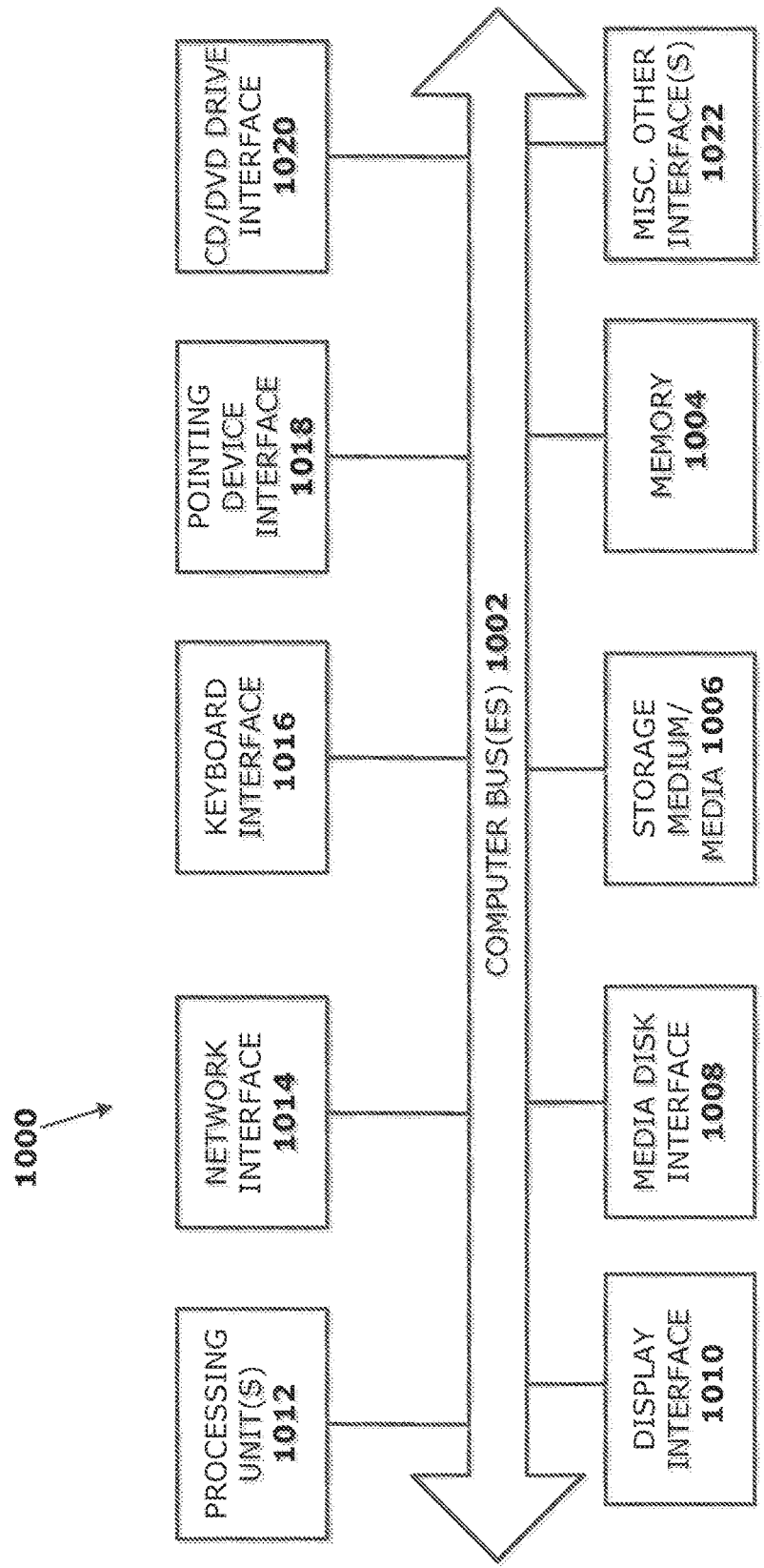
FIG. 10 illustrates internal architecture of a computing device in accordance with embodiments described herein.

As shown in the example of FIG. 10, internal architecture of a computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

Figure 11:
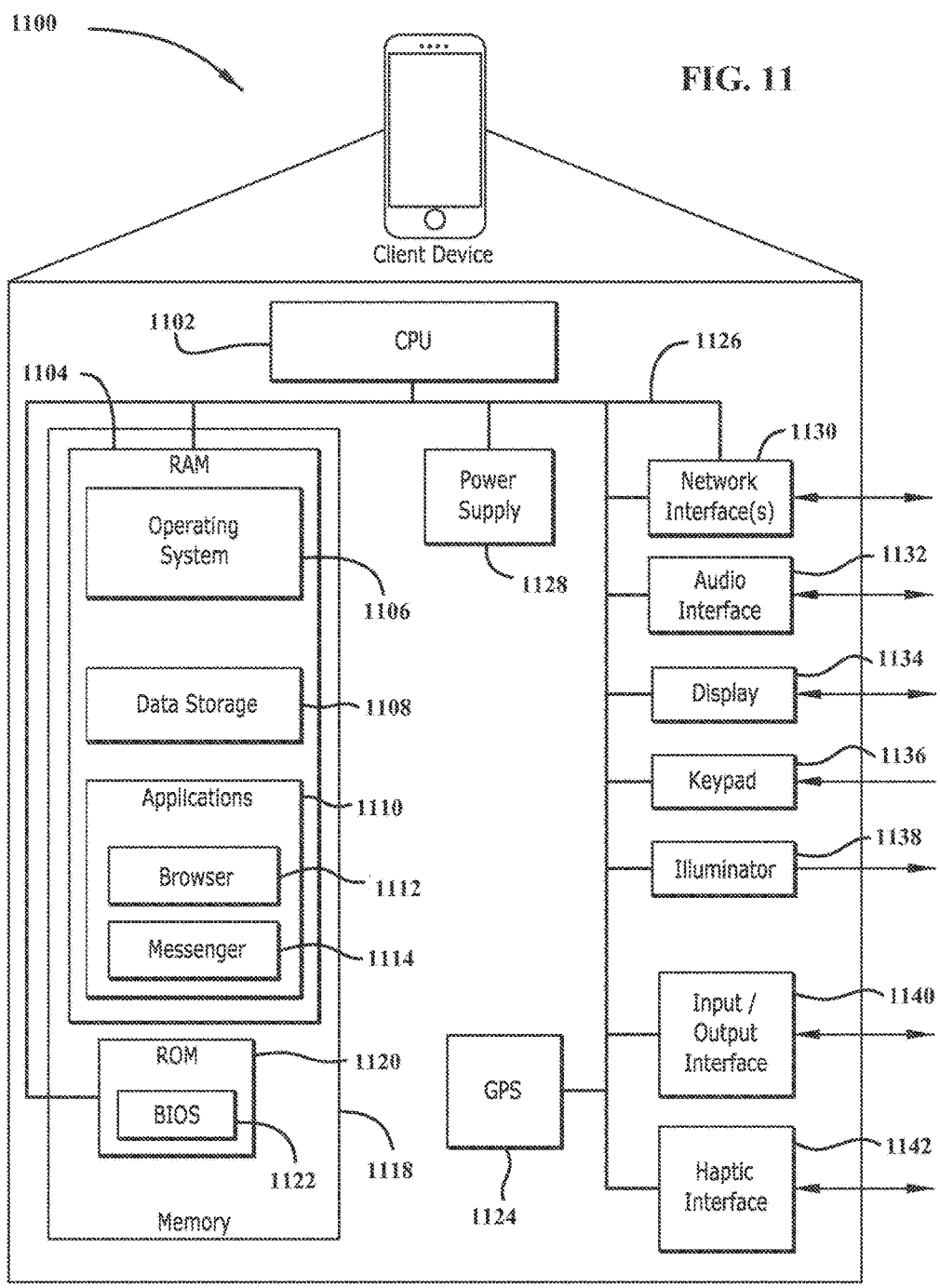
FIG. 11 is a schematic diagram illustrating a client device implementation of a computing device in accordance with embodiments of the present disclosure.

FIG. 11 is a schematic diagram illustrating a client device implementation of a computing device in accordance with embodiments of the present disclosure. A client device 1100 may include a computing device capable of sending or receiving signals, such as via a wired or a wireless network, and capable of running application software or "apps" 1110. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device or a user device can include standard components such as a CPU 1102, power supply 1128, a memory 1118, ROM 1120, BIOS 1122, network interface(s) 1130, audio interface 1132, display 1134, keypad 1136, illuminator 1138, I/O interface 1140 interconnected via circuitry 1126. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled client device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

A client device 1100 may include or may execute a variety of operating systems 1106, including a personal computer operating system, such as a Windows, iOS or Linux, or a mobile operating system, such as iOS, Android, or Windows Mobile, or the like. A client device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1100 may also include or execute an application to communicate content, such as, for example, textual content, multimedia content, or the like. A client device 1100 may also include or execute an application to perform a variety of possible tasks, such as browsing 1112, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    detecting, by a processor of a user device comprising a display screen, a user's face relative to the display screen;
    analyzing, by the processor, the user's face, and based on said analysis, identifying facial features associated with the user's face and positions of each facial feature of the user's face as displayed on the display screen, said facial features comprising eye position information relating to where on the display screen a user's gaze is focused;
    calibrating, by the processor, the user's face by mapping the identified facial features to the identified positions of each facial feature;
    receiving, by the processor, information indicating changes in the gaze of the user;
    tracking, by the processor, the changes in the gaze based on the calibration of the user's face;
    detecting, by the processor, based on said tracking, that the user's gaze has stopped moving at a detected gaze position of the display screen;
    polling, by the processor, a resting time period of the user's gaze at the detected gaze position;
    determining, by the processor, that the polled resting time period exceeds a predetermined time period; and
    identifying, by the processor, elements on the display screen being viewed by the user for further user interactions with the user device, said identified elements being situated on the display screen at the position that corresponds to where said user's gaze stopped.

2. The method of claim 1, further comprising:
    displaying, by the processor, a cursor on the display screen at the end of the calibration.

3. The method of claim 2, wherein tracking the user's gaze comprises moving the cursor to the portions of the display screen being viewed by the user.

4. The method of claim 3, wherein detecting that the user's gaze has stopped moving comprises determining that the cursor has stopped moving on the display screen.

5. The method of claim 1, wherein calibrating the user's face comprises obtaining visual input of the user.

6. The method of claim 5, wherein obtaining the visual input comprises detecting movements of the user.

7. The method of claim 6, wherein the movements comprise a movement selected from a group of movements consisting of tilting of the head, making a facial gesture, moving the head left or right, and nodding.

8. The method of claim 7, wherein the facial gesture comprises a gesture selected from a group of gestures consisting of winking, grimacing, and moving one or both eyebrows.

9. The method of claim 1, further comprising:
    determining, by the processor, if a visual input is detected:
    if the visual input is detected, executing, by the processor, commands associated with the detected visual input; and
    if no visual input is detected, continuing tracking, by the processor, of the user's gaze.

10. The method of claim 1, further comprising:
    detecting, by the processor, that the user's gaze has not stopped; and
    continuing tracking, by the processor, the user's gaze.

11. The method of claim 1, wherein the further user interactions with the user device comprise visual commands to operate the identified elements.

12. The method of claim 1, wherein calibrating the user's face comprises identifying if the user's face is within a field of view of an image apparatus of the user device.

13. The method of claim 12, wherein identifying if the user's face is within the field of view is based on an automatic detection procedure that determines variations within the field of view.

14. The method of claim 13, wherein the variations within the field of view are selected from a group of variations consisting of variation in color, contour, and texture.

15. The method of claim 1, wherein calibrating the user's face comprises visually indicating, via displaying a geometric shape on the display screen, an area on the display screen within which the user should visually position their face.

16. An apparatus comprising:
    a display screen;
    at least one processor; and
    a non-transitory computer-readable storage medium for tangibly storing thereon program logic for execution by the processor, the program logic comprising:
    logic executed by the processor for detecting a user's face relative to the display screen;
    logic executed by the processor for analyzing the user's face, and based on said analysis, identifying facial features associated with the user's face and positions of each facial feature of the user's face as displayed on the display screen, said facial features comprising eye position information relating to where on the display screen a user's gaze is focused;
    logic executed by the processor for calibrating the user's face by mapping the identified facial features to the identified positions of each facial feature;
    receiving, by the processor, information indicating changes in the gaze of the user;
    logic executed by the processor for tracking the changes in the gaze based on the calibration of the user's face;
    logic executed by the processor for detecting based on said tracking, that the user's gaze has stopped moving at a detected gaze position of the display screen;
    logic executed by the processor for polling a resting time period of the user's gaze at the detected gaze position;

logic executed by the processor for determining that the polled resting time period exceeds a predetermined time period; and logic executed by the processor for identifying elements on the display screen being viewed by the user for further user interactions with the user device, said identified elements being situated on the display screen at the position that corresponds to where said user's gaze stopped.

17. The apparatus of claim 16, the program logic further comprising:

logic executed by the processor for displaying a cursor on the display screen at the end of the calibration.

18. The apparatus of claim 17, the tracking logic further comprising:

logic executed by the processor for moving the cursor to the portions of the display screen being viewed by the user.

19. The apparatus of claim 16, the calibration logic further comprising:

logic executed by the processor for identifying if the user's face is within a field of view of an image apparatus of the user device.

20. A non-transitory computer readable storage medium tangibly encoded with computer-executable instructions, that when executed by a processor of a user device, perform a method comprising:

detecting, by a processor of a user device comprising a display screen, a user's face relative to the display screen;

analyzing, by the processor, the user's face, and based on said analysis, identifying facial features associated with the user's face and positions of each facial feature of the user's face as displayed on the display screen, said facial features comprising eye position information relating to where on the display screen a user's gaze is focused;

calibrating, by the processor, the user's face by mapping the identified facial features to the identified positions of each facial feature;

receiving, by the processor, information indicating changes in the gaze of the user;

tracking, by the processor, the changes in the gaze based on the calibration of the user's face;

detecting, by the processor, based on said tracking, that the user's gaze has stopped moving at a detected gaze position of the display screen;

polling, by the processor, a resting time period of the user's gaze at the detected gaze position;

determining, by the processor, that the polled resting time period exceeds a predetermined time period; and identifying, by the processor, elements on the display screen being viewed by the user for further user interactions with the user device, said identified elements being situated on the display screen at the position that corresponds to where said user's gaze stopped.

* * * * *